2,744,056
Patented May 1, 1956

2,744,056

CATALYTIC CONVERSION PROCESS EMPLOYING AS CATALYST, A HALLOYSITE CLAY ACTIVATED WITH MAGNESIUM OXIDE

William C. Offutt, Edgewood, and Arthur C. Whitaker, Pittsburgh, Pa., assignors to Gulf Research & Development Company, Pittsburgh, Pa., a corporation of Delaware No Drawing. Application September 18, 1952, Serial No. 310,363

6 Claims. (Cl. 196—52)

This invention relates to a catalytic conversion process, and more particularly to a catalytic process for cracking high-boiling hydrocarbons to lower boiling hydrocarbons.

In recent years certain halloysite mineral clays, briefly referred to as halloysite clays, have been employed or proposed for use as catalytic cracking catalysts in the petroleum industry. For example, an acid-treated halloysite clay from the environs of Eureka, Utah, marketed by the Filtrol Corporation, Los Angeles, California, has found wide commercial use as a cracking catalyst under the trade name of "Filtrol SR." One sample of this clay has the following analysis before acid treatment:

| Component: | Wt. percent |
|---|---|
| $SiO_2$ | 43.98 |
| $Al_2O_3$ | 38.46 |
| FeO | 0.03 |
| MgO | Trace |
| CaO | 0.32 |
| $Na_2O$ | 0.14 |
| $K_2O$ | 0.48 |
| $H_2O$ | 17.17 |
| $TiO_2$ | 0.01 |
| | 100.59 |

As heretofore indicated, this clay is acid-treated prior to being sold as a commercial cracking catalyst and a significant percentage of the alkali metal oxides as well as a minor percentage of the alumina and other oxides are removed during the acid-treatment.

While the advent of halloysite type cracking catalysts has been relatively recent, montmorillonite mineral clay cracking catalysts have been widely used for many years. The montmorillonites differ basically from halloysite in that the latter is a mineral constituent of a kaolin clay, whereas the montmorillonites are mineral constituents of bentonite clays. In terms of their chemical analysis, montmorillonite cracking catalysts differ from the halloysite cracking catalysts in the relative concentration of silica to alumina. Thus, in montmorillonite cracking catalysts, the weight percentage of alumina is usually but of the order of 10 to 20 per cent of the silica, while in halloysite cracking catalysts, such as Filtrol SR, the concentration of silica only slightly exceeds that of the alumina.

A major advantage of halloysite cracking catalysts over conventional montmorillonite cracking catalysts is their superior resistance to stocks obtained from high sulfur crudes. Thus, when catalytic cracking feeds having a sulfur content in excess of about 0.5 weight percent sulfur, such as gas oil or cycle oil derived from these high sulfur stocks are charged to a commercial catalytic converter and cracked at a conventional cracking temperature of about 700° to 1100° F., the duration of the catalyst life of halloysite cracking catalysts greatly exceeds that of the montmorillonite cracking catalysts. This has led to the adoption of these catalysts in refineries charging high sulfur stocks.

However, it has also been found that halloysite cracking catalysts have a higher carbon factor than montmorillonite cracking catalysts. By "carbon factor" is meant the comparative amount of carbon or coke deposited upon the catalyst at different activity levels in the course of a catalytic cracking operation. It is necessary to remove this coke inasmuch as its presence reduces the cracking activity of the catalyst. This is conventionally effected by regenerating the catalyst through oxidative combustion of the coke at an elevated temperature, such as one within the range 1000° to 1200° F. The carbon factor has a direct relationship to the capacity of the regenerator of the catalytic cracking unit, inasmuch as the greater the carbon factor, the smaller will be the capacity of the regenerator. Since the regenerator capacity is a primary limiting factor in the throughput of commercial catalytic cracking units, this handicap of halloysite catalysts has proved to be of commercial importance.

Accordingly, this invention has as an object the provision of a catalytic conversion process in which a high-boiling hydrocarbon is catalytically cracked without depositing a relatively large amount of carbon upon the catalyst. We have found that this is accomplished by catalytically cracking a high-boiling hydrocarbon in the presence of a catalyst containing about 1 to 20 percent by weight of magnesium oxide deposited upon halloysite and preferably about 2 to 10 percent by weight of magnesium oxide.

Any of the conventional catalytic cracking process procedures can be employed in the catalytic conversion process of our invention. Thus the process of our invention may be effected by: the fixed bed procedures such as the so-called Houdry process wherein the catalyst in the form of small pellets or granules is disposed in a stationary bed; the moving bed procedures such as either the so-called Thermofor Catalytic Cracking process or the Houdriflow process wherein the catalyst is caused to move downwardly through the reactor in a continuous bed; and the so-called fluid procedures wherein the catalyst in the form of fine particles is usually disposed in a fluid bed to which catalyst is continuously added and from which catalyst is continuously removed. Each of the afore-mentioned procedures involves the regeneration of the catalyst by burning off coke, which is deposited upon the catalyst during the course of the process, at a temperature of the order of 1000° to 1200° F. This regeneration is accomplished on the catalyst in situ in fixed bed procedures, and in a separate regenerator in the moving bed and fluid procedures. Such regeneration of the catalyst is to be included within the process of our invention.

The catalysts employed in the process of our invention can be prepared in accordance with the methods set forth in U. S. application, Serial No. 310,364, filed on even date by William C. Offutt and Arthur C. Whitaker. One such method is to immerse halloysite in an aqueous solution of a soluble magnesium salt such as magnesium chloride and then to precipitate the magnesium in the form of its hydroxide upon the halloysite by the addition of an aqueous alkaline solution. Ammonium hydroxide is the preferred aqueous alkaline solution, inasmuch as alkali metals have a deactivating effect upon the finished catalyst and the presence of sodium or potassium ions should therefore be avoided. However, solutions of alkali metal hydroxides can be used provided all of the alkali metal is removed by washing after the precipitation of the magnesium hydroxide. After the magnesium has been precipitated upon the halloysite in the form of magnesium hydroxide, the mixture is dried at elevated temperatures. Catalysts can also be prepared in accordance with our invention by immersing halloysite in an aqueous solution of a soluble magnesium salt such as a solution of magnesium nitrate, which magnesium salt is thermally decomposable at elevated temperatures, and then decomposing the salt to magnesium oxide by heating the wet halloysite to an elevated temperature. Also catalyst can be prepared by slurrying halloysite in a hot solution of magnesium bicarbonate and then filtering the halloysite and drying it at elevated temperatures.

We shall describe the preparation of a number of catalysts and their use in the process of our invention in the following examples.

The carbon factor and percent by weight of feed conversion for each catalyst were determined by catalytically cracking a Mid-Continent light gas oil having an A. P. I. gravity of about 35 and a distillation of about as follows:

|  | °F. |
|---|---|
| 10% | 520 |
| 50% | 580 |
| 90% | 690 |
| End point | 750 | at a cracking temperature of 920° F. and a space velocity of 2 parts by weight of oil per hour per weight of catalyst in the presence of the catalyst for a period of 20 minutes. The weight percent conversion was determined by subtracting the weight percent of unreacted gas oil from 100. The carbon yield at the resultant conversion was compared with the carbon yield of a standard catalyst (a commercial synthetic silica-alumina catalyst known as "Diakel," prepared by the Davison Chemical Corporation, Baltimore, Maryland) at the same conversion, and the ratio of the two carbon yields designated the carbon factor.

Example I

A batch of Filtrol SR halloysite cracking catalyst was evacuated and then impregnated at room temperature with an aqueous solution of magnesium nitrate containing a magnesium oxide concentration of about 11.5 weight percent. The treated composite was then oven-dried for 24 hours at 125° C. and calcined for 16 hours at a temperature of up to about 1000° F. The catalyst contained about 7.2 weight percent of magnesium oxide. The twenty-minute carbon factor for this catalyst was but 1.04 whereas the carbon factor for the untreated Filtrol SR catalyst was 1.74, and the percent by weight gas oil conversions were 30.7 and 43.8 respectively.

The reduction in the carbon factor by the deposition of magnesium oxide upon the halloysite cracking catalyst is both striking and unexpected. Thus, when a montmorillonite cracking catalyst whose twenty-minute carbon factor was 1.08 was treated with magnesium in accordance with the procedure set forth in U. S. Patent No. 2,431,206 to William E. Spicer and Jerry A. Pierce to produce a catalyst containing 5 weight percent of magnesium oxide, the carbon factor of the treated catalyst was raised to 1.14.

Example II 350 parts by weight of Filtrol SR were slurried in an aqueous solution of magnesium chloride containing sufficient magnesium to equal a magnesium oxide concentration of about 12.4 weight percent. To this slurry a sufficient amount of ammonium hydroxide in the form of an aqueous solution containing approximately one part by weight of 28 percent ammonium hydroxide for each 5 parts by weight of water was added to provide a sufficient excess of ammonium hydroxide to be 100 percent in excess over the theoretical amount of ammonium hydroxide required to precipitate the magnesium in the form of magnesium hydroxide. The combined mixture was filtered and then washed with 250 parts by weight of distilled water, removed from the filter and slurried with 250 parts by weight of distilled water and filtered again. The filtered material was dried for 24 hours at 125° C. and then calcined for 16 hours at a temperature of up to 1000° F. The resulting catalyst contained about 5.0 weight percent of magnesium oxide and had a twenty-minute carbon factor of 1.29, and a percent by weight gas oil conversion of 38.0.

Example III

Dried Filtrol SR similar to that used in Example I was evacuated and then treated with an aqueous magnesium nitrate solution containing a magnesium oxide concentration of about 7.9 weight percent. The treated mixture was oven-dried for 24 hours at 125° C. and calcined for 16 hours at a temperature of up to 1000° F. The resultant catalyst contained about 3.5 weight percent of magnesium oxide and had a carbon factor of 1.14, and a percent by weight gas oil conversion of 29.2.

The composites of our invention have improved selectivity when employed as cracking catalysts in the catalytic cracking of high-boiling hydrocarbons. Thus, smaller regenerator units can be employed to maintain a given carbon level for a given catalyst inventory, or if desired, a larger throughput for a given catalytic cracking unit can be used.

Obviously many modifications and variations of the invention as hereinbefore set forth may be made without departing from the spirit and scope of the invention; therefore only such limitations should be imposed as are indicated in the appended claims.

We claim:

1. A catalytic conversion process in which a high-boiling hydrocarbon is catalytically cracked in the presence of a catalyst comprising about 2 to 10 per cent by weight of magnesium oxide incorporated on an acid-activated halloysite cracking catalyst, at a temperature of about 700° to 1100° F. to yield a product comprising lower boiling hydrocarbons.

2. A catalytic conversion process in which a high-boiling hydrocarbon is catalytically cracked in the presence of a catalyst comprising about 2 to 10 per cent by weight of magnesium oxide incorporated on an acid-activated halloysite cracking catalyst, at a temperature of about 700° to 1100° F. to yield a product comprising lower boiling hydrocarbons and coke deposited upon the catalyst, and regenerating the catalyst to remove the coke through oxidative combustion at a temperature of about 1000° to 1200° F.

3. A process for cracking hydrocarbon oils comprising passing the oil to be cracked at cracking conditions and for periods sufficient to convert a portion of the oil to lower boiling hydrocarbon compounds in contact with a catalyst prepared by impregnating an acid-activated halloysite cracking catalyst with 2 to 10 per cent, as magnesia, of a magnesium compound decomposable to form magnesia, and decomposing the magnesium compound and activating the composite of halloysite and magnesia.

4. A process as set forth in claim 3 in which the magnesium compound is decomposible by heating to form magnesium oxide.

5. A process as set forth in claim 3 in which the magnesium compound is magnesium bicarbonate.

6. A process for cracking hydrocarbon oils comprising passing the oil to be cracked at cracking conditions and for periods sufficient to convert a portion of the oil to lower boiling hydrocarbon compounds in contact with a catalyst prepared by impregnating an acid-activated halloysite cracking catalyst with 2 to 10 per cent, as magnesia, of a soluble magnesium salt, adding an aqueous alkaline solution to the impregnated halloysite cracking catalyst to precipitate magnesium hydroxide thereon, and drying and calcining the impregnated halloysite cracking catalyst to convert the magnesium hydroxide to magnesium oxide and activate the composite of halloysite and magnesia.

References Cited in the file of this patent
UNITED STATES PATENTS

| | | |
|---|---|---|
| 2,431,206 | Spicer et al. | Nov. 18, 1947 |
| 2,485,626 | Mills | Oct. 25, 1949 |